US007623535B2

(12) United States Patent
Guichard et al.

(10) Patent No.: US 7,623,535 B2
(45) Date of Patent: Nov. 24, 2009

(54) ROUTING PROTOCOL SUPPORT FOR HALF DUPLEX VIRTUAL ROUTING AND FORWARDING INSTANCE

(75) Inventors: James Guichard, Groton, MA (US); Robert Hanzl, Hostivice (CZ)

(73) Assignee: Cisco Technology, Inc., San Jose, CA (US)

( * ) Notice: Subject to any disclaimer, the term of this patent is extended or adjusted under 35 U.S.C. 154(b) by 776 days.

(21) Appl. No.: 10/937,661

(22) Filed: Sep. 9, 2004

(65) Prior Publication Data

US 2006/0050653 A1   Mar. 9, 2006

(51) Int. Cl.
*H04L 12/56* (2006.01)
*H04L 12/28* (2006.01)
(52) U.S. Cl. .................. 370/409; 370/389; 370/395.31
(58) Field of Classification Search ........................ None
See application file for complete search history.

(56) References Cited

U.S. PATENT DOCUMENTS

| 5,610,905 | A | 3/1997 | Murthy et al. |
|---|---|---|---|
| 6,009,081 | A | 12/1999 | Wheeler et al. |
| 6,081,508 | A | 6/2000 | West et al. |
| 6,526,056 | B1 | 2/2003 | Rekhter et al. |
| 6,574,224 | B1 | 6/2003 | Brueckheimer et al. |
| 6,640,239 | B1 | 10/2003 | Gidwani |
| 6,680,940 | B1 | 1/2004 | Lewin et al. |
| 6,680,943 | B1 | 1/2004 | Gibson et al. |
| 6,683,865 | B1 | 1/2004 | Garcia-Luna-Aceves et al. |
| 6,697,329 | B1 | 2/2004 | McAllister et al. |
| 6,724,881 | B1 | 4/2004 | McAllister et al. |
| 7,020,085 | B2 | 3/2006 | Mimura et al. |
| 7,116,665 | B2 | 10/2006 | Balay et al. |
| 7,152,115 | B2 | 12/2006 | Ould Brahim et al. |
| 7,313,605 | B2 | 12/2007 | Iloglu et al. |
| 2002/0181477 | A1 | 12/2002 | Mo et al. |
| 2003/0223406 | A1* | 12/2003 | Balay et al. .................. 370/352 |
| 2004/0076165 | A1* | 4/2004 | Jean-Francois et al. ..... 370/400 |

(Continued)

FOREIGN PATENT DOCUMENTS

WO          03/073707 A1      9/2003

OTHER PUBLICATIONS

Gleeson, B., et al., "A Framework for IP Based Virtual Private Networks," Request for Comments 2764—Network Working Group, Feb. 2000, pp. 1-63, XP015008547, http:/www.sanface.com./txt2pdf.html.

(Continued)

*Primary Examiner*—Chi H Pham
*Assistant Examiner*—Warner Wong
(74) *Attorney, Agent, or Firm*—BainwoodHuang (57) ABSTRACT

A method, apparatus and computer program product for providing dynamic routing support for Half-Duplex Virtual Routing and Forwarding (HDVRF) environments. The method, apparatus and computer program function to configure a forwarding Virtual Routing and Forwarding (VRF) table for a router with information to forward incoming packets to a central location within a hub and spoke environment. The method, apparatus and computer program also function to populate a routing Virtual Routing and Forwarding (VRF) table for the router with routing information received from ingress interfaces of the router. The method, apparatus and computer program function further forwards packets received on egress interfaces of the router according to the forwarding VRF table.

30 Claims, 4 Drawing Sheets

U.S. PATENT DOCUMENTS

| | | | |
|---|---|---|---|
| 2004/0141462 A1 | 7/2004 | Mistry et al. | |
| 2004/0177157 A1* | 9/2004 | Mistry et al. | 709/241 |
| 2005/0025069 A1 | 2/2005 | Aysan | |
| 2005/0071130 A1* | 3/2005 | Benjamin et al. | 702/188 |
| 2005/0083955 A1 | 4/2005 | Guichard et al. | |
| 2005/0188106 A1* | 8/2005 | Pirbhai et al. | 709/238 |
| 2005/0265308 A1* | 12/2005 | Barbir et al. | 370/351 |
| 2005/0286441 A1* | 12/2005 | Huang | 370/254 |
| 2006/0002401 A1* | 1/2006 | Mukherjee et al. | 370/401 |
| 2007/0271605 A1 | 11/2007 | Le Pennec et al. | |

OTHER PUBLICATIONS

Rosen, E Rekhter Y: "BGP/MPLS VPNs," Mar. 1999, Network Working Group, Request for Comments 2547, pp. 1-24, XP-002959287, http:/www.ietf.org/rfc/rfc2547.txt?number=2547.

* cited by examiner

ROUTING PROTOCOL SUPPORT FOR HALF DUPLEX VIRTUAL ROUTING AND FORWARDING INSTANCE

BACKGROUND

Half-Duplex Virtual Routing and Forwarding (HDVRF) maintain separate routing policy information entries to forward network traffic through a network node depending on the direction of the network traffic. Maintaining separate routing policy information (e.g., half duplex VRF information) for different directional traffic ensures that such traffic can be forwarded through a specified node and eventually to a target even though the network traffic may have otherwise traversed a shorter, more direct path to reach the target. A detailed description of HDVRF can be found in co-pending patent application Ser. No. 10/674,079, having the same inventorship and Assignee as the present application. The contents of patent application Ser. No. 10/674,079 are herein incorporated by reference in their entirety.

One conventional implementation of HDVRF involves maintaining separate upstream routing policy information and downstream policy information at a first network node supporting throughput of network traffic. The upstream routing policy information at the first node is used to identify a second node to forward upstream traffic (e.g., network traffic received from one or multiple sources traveling in a first direction) received from a first client communicating through the first node. The downstream routing policy information at the first node is used to forward downstream network traffic (e.g., network traffic received from one or multiple sources traveling in a second direction) received from another node to the first client. Thus, in general, separate routing policy entries are maintained to support routing and forwarding of traffic depending on their direction. By preventing use of the downstream policy routing information to route upstream network traffic, the first node may forward or route traffic along a path that the network traffic otherwise would have not traveled. Thus, network traffic communicated through the first node can be forced to travel through a network node (e.g., a second node) that it would have not otherwise have traveled if the downstream policy information was used to route the network traffic.

It should be noted that use of the relative terms upstream and downstream merely identify network traffic in different directions. For example, in the context of a service provider network supporting transmission of messages between a client and a service provider network, upstream traffic may be network messages received from a client for transmission to a target device such as a provider edge 'hub' node or customer edge 'hub' node. Downstream traffic may be network traffic received at the first node from a wholesale service provider network (or at least traffic routed through the service provider network).

In another conventional implementation of HDVRF, the first network node may be configured to receive a session initiation request from a client desiring to establish a session to communicate through the first node. The client may not yet be assigned a network address for transmitting and receiving data messages. Upon receipt of the session initiation request, the first node may obtain network address assignment information from a network address server (e.g., a RADIUS server that assigns IP addresses for use by requesting clients) for the first client that generated the session initiation request. The assignment information including network address information may be forwarded to the first node and other network nodes for creating routes. For example, an assigned network address may uniquely identify a client over other nodes in the network.

In addition to notifying the client of its assigned network address information, the first node may populate its downstream routing policy information to include the network address information identifying the requesting client node. Generally, inclusion of the network address information of the client in the downstream routing policy information enables the first node to route information received from other upstream nodes back to the client. In one application, the first node populates the downstream policy information (e.g., VRF information for routing data packets to the clients) with network address information of each new client associated with a given service. Thus, a list of supported clients nodes may be dynamically updated depending on establishment and termination of client network sessions.

Because the upstream and downstream routing policy information varies depending on which direction of traffic they support, they each may include information associated with multiple clients. For example, the downstream routing policy information may be a VRF including a list of multiple clients supported by or coupled to the first node. In contradistinction, conventional methods require tracking separate VRF instances for each of multiple clients. According to an embodiment of HDVRF, one VRF for upstream information includes a default address (or aggregate) or target (e.g., a hub) to route the upstream traffic while another VRF for the downstream traffic includes a list of multiple client's network address information. Based on the reduction of the number of separate VRF instances, overhead maintenance of VRFs and use of memory resources to store the VRFs is reduced.

After the downstream policy information is populated in the first node for a new client, the first node may distribute the network address information populated in the downstream policy information (at the first node) to other nodes via use of a notification message distributed according to a system routing protocol such as BGP (Border Gateway Protocol). For example, the first node may be a first provider edge node of a network to which multiple clients are coupled. The first provider edge node may distribute each new network address associated with corresponding clients to a second node such as a second provider edge node of a core network supporting MPLS. Generally, the network address information sent to the second node (or multiple relevant nodes in a wholesale service provider network) is used to update routing policy information at the second node. The routing policy information at the second node is used in turn to identify a route on which to forward appropriately destined traffic to the clients coupled to the first provider edge node.

As discussed, for traffic received from the clients (such as upstream traffic), the first node utilizes the upstream routing policy information to identify a target node to forward the traffic regardless of a destination address associated with the traffic. More specifically, the first node may receive a network message from a client coupled to communicate through the first node. The first node utilizes the upstream routing policy information in the first node to identify a path or default route on which to forward the network traffic. Even if a destination address of the network traffic is another client coupled to the first node, the first node looks up a target route in the upstream routing policy information to identify a default route or node (such as a provider edge hub node or customer edge hub node) to forward the traffic. This technique of preventing use of the downstream routing policy information at the first node forces the network traffic to travel a path that it otherwise may not have traveled if the downstream routing policy information were available (e.g., in the same VRF table) to route upstream traffic. For example, if a first client coupled to the first node sends a message to a second client coupled to the first node, the first node might route the message received from the first client directly to the second client if the downstream routing policy information were available to route data. According to principles of the present invention, the message is forwarded along a route or target (such as a default route or target) specified by the upstream routing policy information even though a shorter path may exist directly back to the second client.

According to one conventional implementation, the upstream routing policy information and downstream policy information at the first node enables establishment of a VPN (Virtual Private Network) connection between the first node and the second node (e.g., the default hub node) on which to forward traffic from the first client. Based on routing policy information at the second node, a return path (such as another VPN) may be established between the second node and the first node on which to forward the network messages to the first client through the first node.

Forcing traffic to travel through a node that it otherwise would not have traveled serves multiple purposes. For example, a target-specific packet processing technique for monitoring data packet flows may be implemented at the second node (such as a node of an ISP network) to monitor an amount of traffic associated with a particular client. Thus, a service provider may identify how much to charge a client for transmitting data through the network. Additionally, a monitoring authority such as an agency may monitor contents of data packets at the second node to identify whether the network is being used for illicit purposes.

SUMMARY

Conventional mechanisms such as those explained above suffer from a variety of deficiencies. One such shortcoming is that conventional HDVRF cannot be used with a dynamic routing protocol such as Routing Information Protocol (RIP) or Open Shortest Path First (OSPF). With a dynamic routing protocol, routers learn about the topology of the network by communicating with other routers. Thus, if a router is moved, additional routers are added, or in the case where a router fails, the other routers learn about the change or failure and can adjust their routing tables accordingly. Since conventional HDVRF utilizes separate upstream and downstream routing tables for a router, a dynamic routing protocol cannot be used with conventional HDVRF. Accordingly, any changes to a network utilizing HDVRF must be manually entered into the upstream and downstream routing tables in order to provide proper network operation. This operation of manual entry of network changes can be time consuming, labor intensive and is prone to human error.

Embodiments of the invention significantly overcome such limitations and provide mechanisms and techniques that provide dynamic routing protocol support for HDVRF environments. The routing protocols run completely in the downstream Virtual Routing and Forwarding (VRF) context, and have no knowledge of the upstream VRF. The connected interfaces are also in the downstream VRF in order to locally terminate packets destined for the router itself. The interface addresses with a /32 mask are injected into the upstream VRF for the locally terminated packets, the context is switched to downstream so all the locally running applications and routing protocols receive the packets in the expected context.

In a particular embodiment, a method of providing dynamic routing support for Half-Duplex Virtual Routing and Forwarding (HDVRF) environments includes configuring a forwarding VRF table for a spoke router, wherein the forwarding VRF table includes information to forward incoming packets to a central location within a hub and spoke environment. The method also includes populating a routing Virtual Routing and Forwarding (VRF) table for the spoke router with routing information received from ingress interfaces of the spoke router. Packets received on ingress interfaces of the spoke router are forwarded according to the forwarding VRF table.

Other embodiments include a computer readable medium having computer readable code thereon for providing dynamic routing support for Half-Duplex Virtual Routing and Forwarding (HDVRF) environments. The medium includes instructions for configuring a forwarding Virtual Routing and Forwarding (VRF) table for a spoke router, the forwarding VRF table including information to forward incoming packets to a central location within a hub and spoke environment. The medium also includes instructions for populating a routing Virtual Routing and Forwarding (VRF) table for the spoke router with routing information received from the hub and from ingress interfaces of the router and for propagating the routing information learned from the egress interfaces of the spoke router to the hub. The medium further includes instructions for forwarding packets received on ingress interfaces of the router according to the forwarding VRF table.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides dynamic routing support for HDVRF environments as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing dynamic routing support for HDVRF environments as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A method and apparatus for providing dynamic routing protocol support for half duplex virtual routing and forwarding environments includes a forwarding Virtual Routing and Forwarding (VRF) table for a spoke router configured with information to forward incoming packets to a central location within a hub and spoke environment. The spoke router also includes a routing Virtual Routing and Forwarding (VRF) table populated with routing information received from the hub and from ingress interfaces of the router. The spoke router forwards packets received on ingress interfaces according to the forwarding VRF table. As such, any changes to the network topology are reflected appropriately in the routing VRF table and the forwarding VRF table of the spoke router.

Figure 1:
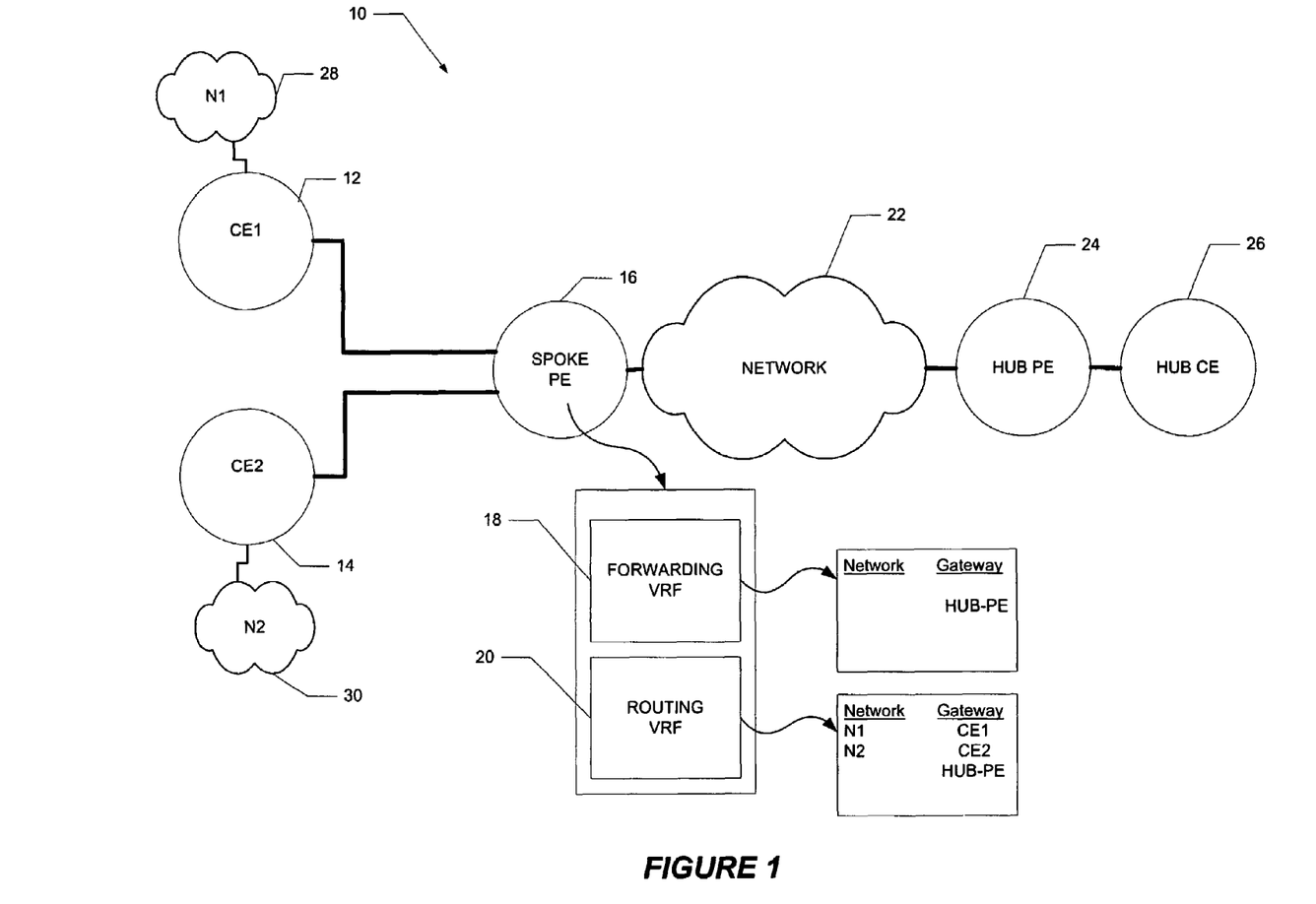
FIG. 1 shows a generic environment for providing dynamic routing in a Half-Duplex Virtual Routing and Forwarding (HDVRF) system in accordance with embodiments of the present invention.

Referring now to FIG. 1, a particular embodiment of an environment 10 that provides dynamic routing protocol support for half duplex virtual routing and forwarding systems is shown. The environment 10 includes a spoke Provider Edge (PE) router 16. The spoke PE router 16 is in communication on one side (the downstream side) with a first Customer Edge (CE) router 12 and a second CE router 14. First CE 12 is also in communication with a first network (N1) 28. Second CE router 14 is also in communication with a second network (N2) 30. A dynamic routing protocol (e.g. OSPF) is running on the CE router 12, CE router 14 and spoke PE router 16.

The spoke PE router 16 is also in communication (on an upstream side) with a network 22. The network 22 may be, for example, a packet switched network such as an Internet Protocol (IP) network or a Multi-Protocol Label Switching (MPLS) network. The network 22 is in communication with a hub PE router 24, which is in communication with a hub CE router 26.

The spoke PE router 16 includes a forwarding Virtual Routing and Forwarding (VRF) table 18. The forwarding VRF table 18 is populated with information received from the hub (in this example, a default route using the hub PE router 24) and is used for forwarding packets received from the first or second CE routers 12 and 14 to a central location within a hub and spoke environment according to the forwarding VRF table 18.

The spoke PE router 16 also includes a routing Virtual Routing and Forwarding (VRF) table 20. The routing VRF table 20 is populated with routing information received from the hub and also with information received from the ingress interfaces of the spoke PE router 16. As shown in FIG. 1, in a particular embodiment, the routing VRF table includes the gateway (CE1) for network N1 and the gateway (CE2) for network N2. Routing information learned from CE 12 and CE 14 is propagated to the hub so the hub can reach CE 12 and CE 14.

Figure 2:
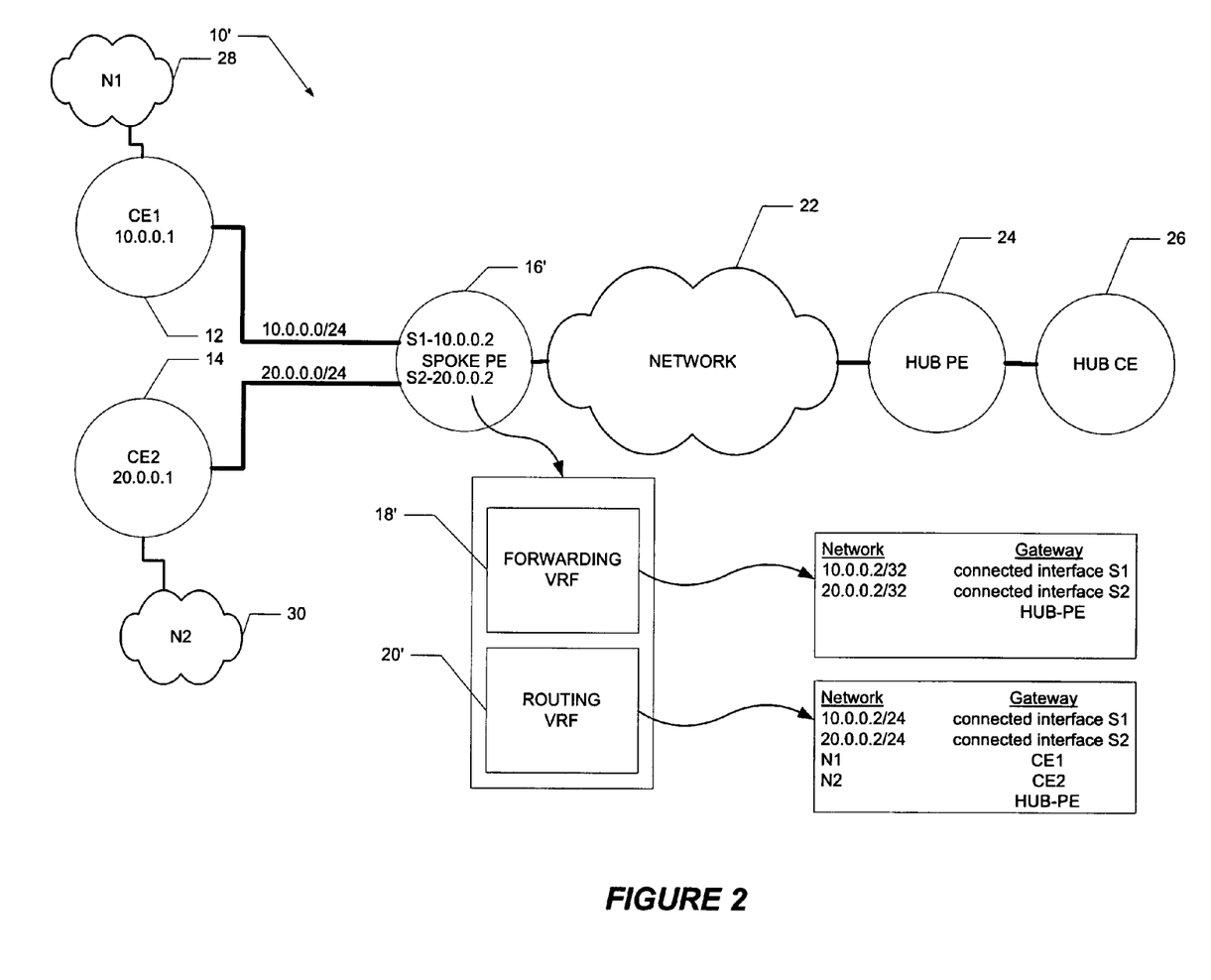
FIG. 2 shows an example environment for providing dynamic routing in a Half-Duplex Virtual Routing and Forwarding (HDVRF) system in accordance with embodiments of the present invention.

Referring now to FIG. 2, an example of a particular embodiment of a second environment 10' is shown. The environment 10' includes a spoke Provider Edge (PE) router 16'. The spoke PE router 16' is in communication on one side (the downstream side) with a first Customer Edge (CE) router 12 and a second CE router 14. First CE 12 is also in communication with a first network (N1) 28. Second CE router 14 is also in communication with a second network (N2) 30. A dynamic routing protocol is running on the CE router 12, CE router 14 and spoke PE router 16'.

The spoke PE router 16' is also in communication (on an upstream side) with a network 22. The network 22 may be, for example, a packet switched network such as an Internet Protocol (IP) network or a Multi-Protocol Label Switching (MPLS) network. The network 22 is in communication with a hub PE router 24, which is in communication with a hub CE router 26.

The spoke PE router 16' includes a forwarding Virtual Routing and Forwarding (VRF) table 18'. The forwarding VRF table 18' is populated with information received from the hub (in this example, a default route using the hub PE router 24) and with addresses having a host mask of /32 for each attached client in order to prevent direct communication between CE 12 and CE 14. A mask identifies the portion of the address that is used for routing purposes, therefore with a mask of /32, all 32 bits of the address are used for routing purposes. The forwarding VRF is used for forwarding packets received from the first or second CE routers 12 and 14 to a central location within a hub and spoke environment according to the forwarding VRF table 18'.

The spoke PE router 16' also includes a routing Virtual Routing and Forwarding (VRF) table 20'. The routing VRF table 20' is populated with routing information received from the hub and also with information received from the ingress interfaces of the spoke PE router 16'. As shown in FIG. 2, in this particular embodiment, the routing VRF table includes the gateway (CE1) for network N1 and the gateway (CE2) for network N2, and with addresses having a non-host mask (e.g. a mask of /24) for each attached client so the correct routing information is propagated through the network. A mask of /24 defines that the first 24 bits of the address are used for routing purposes. As a result, the PE-CE session runs directly between the PE and CE, while any CE-to-CE traffic is forced to go via the hub. In such a manner, a dynamic routing protocol can be run on the spoke PE router 16', CE 12 and CE 14.

Figure 3:
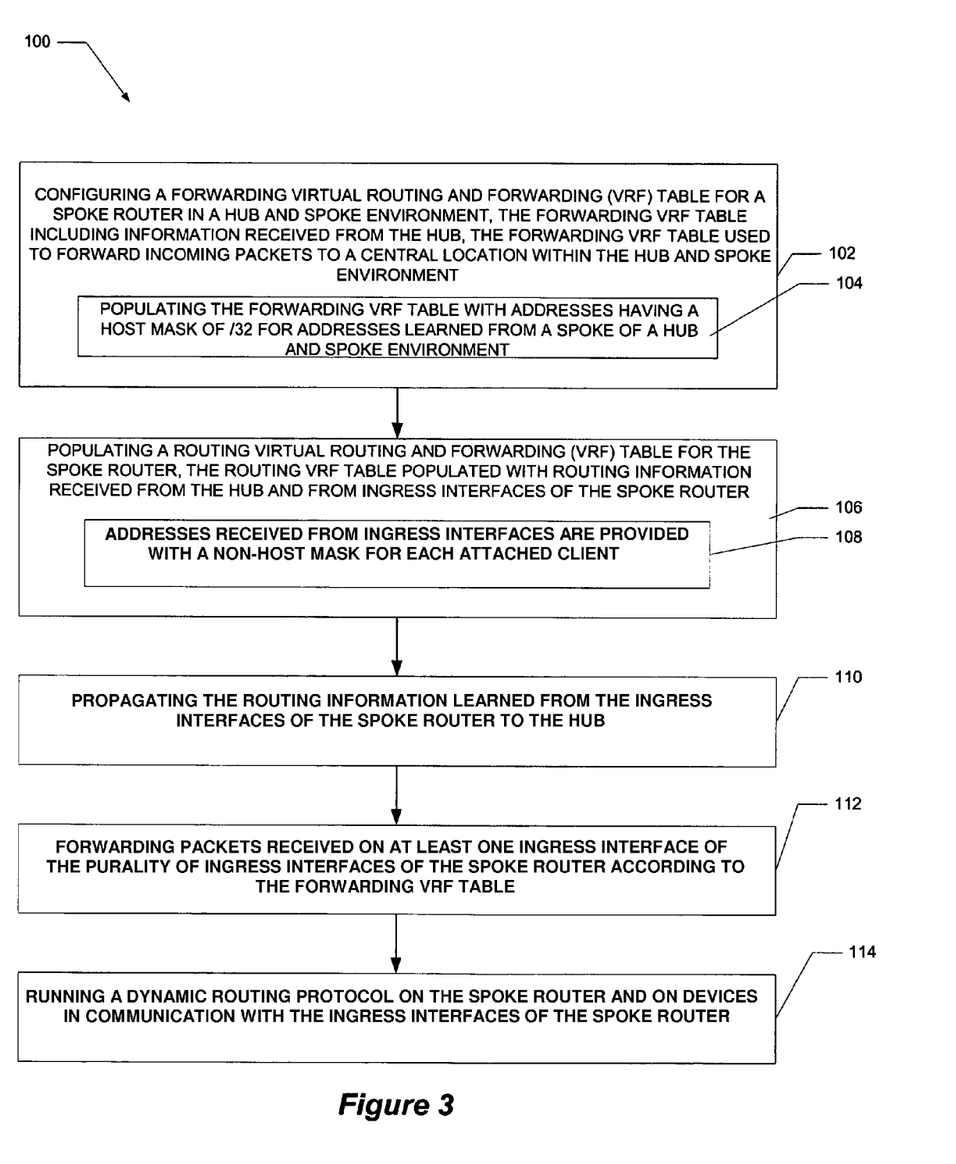
FIG. 3 comprises a flow diagram of a method for providing dynamic routing in Half-Duplex Virtual Routing and Forwarding (HDVRF) in accordance with embodiments of the present invention.

A flow chart of the presently disclosed method is depicted in FIG. 3. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3 (in conjunction with FIGS. 1 and 2) a particular embodiment of a method 100 of providing dynamic routing support for Half-Duplex Virtual Routing and Forwarding (HDVRF) environments is shown. The method starts with processing block 102 which states configuring a forwarding Virtual Routing and Forwarding (VRF) table for a spoke PE router in a hub and spoke environment. The forwarding VRF table includes information received from the hub, and is used to forward incoming packets to a central location within the hub and spoke environment.

Processing block 104 recites that the configuring of a forwarding VRF table includes configuring the forwarding VRF table with addresses having a host mask for each attached client, and that the host mask is a mask of /32. This is done in order to prevent direct communication between clients connected directly to the spoke router.

Processing block 106 discloses populating a routing Virtual Routing and Forwarding (VRF) table for the spoke router. The routing VRF table is populated with routing information received from the hub and from ingress interfaces of the spoke router.

As stated in processing block 108, the addresses received from ingress interfaces of the spoke router are provided with a non-host mask (for example, a mask of /24) for each attached client. As a result, a PE-CE session runs directly between the PE and CE, while any CE-to-CE traffic is forced to traverse a path including the hub.

Processing block 110 discloses propagating the routing information learned from ingress interfaces of the spoke router to the hub, while processing block 112 states forwarding packets received on ingress interfaces of the spoke router according to the forwarding VRF table.

In processing block 114 a dynamic routing protocol is run on the spoke router and on devices in communication with the ingress interfaces of the spoke router. By way of such a method, dynamic routing support for HDVRF environments is provided.

Figure 4:
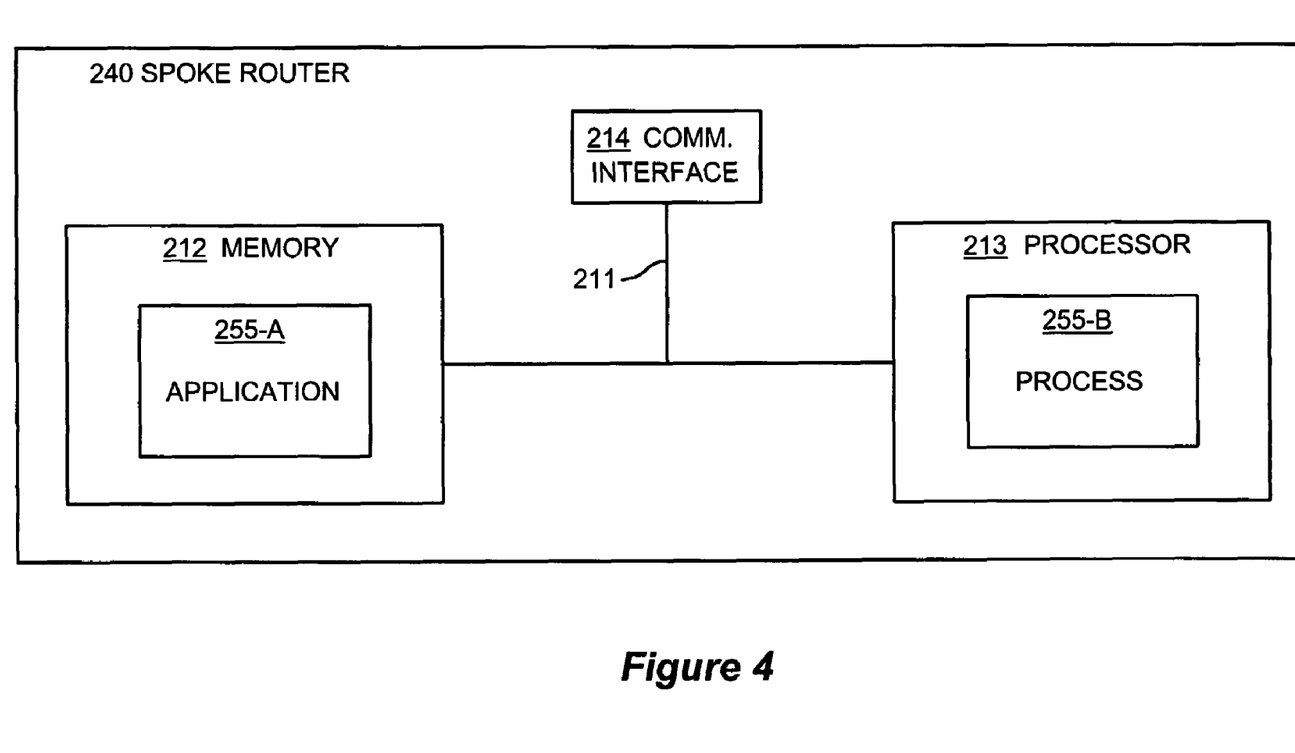
FIG. 4 illustrates an example computer system architecture for a computer system that performs dynamic routing in Half-Duplex Virtual Routing and Forwarding (HDVRF) environments in accordance with embodiments of the present invention.

FIG. 4 illustrates example architectures of a spoke router 240. In this example, the router 240 includes an interconnection mechanism 211 that couples a memory system 212, a processor 213, and a communications interface 214. The communications interface 214 allows the router 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the router. It is to be understood that the router operates as explained in former examples are represented in FIG. 4 by the application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A method of providing dynamic routing support for Half-Duplex Virtual Routing and Forwarding (HDVRF) environments comprising:

configuring a forwarding Virtual Routing and Forwarding (VRF) table for a spoke router in a hub and spoke environment, said forwarding VRF table including information received from the hub, said forwarding VRF table used to forward incoming packets to a central location within the hub and spoke environment;

populating a routing VRF table for said spoke router, said routing VRF table populated with routing information received from the hub and from ingress interfaces of said spoke router;

propagating the routing information learned from ingress interfaces of said spoke router to the hub; and forwarding packets received on at least one ingress interface of said plurality of ingress interfaces of said spoke router according to said forwarding VRF table;

wherein:
   the spoke router is a provider edge (PE) router and the ingress interfaces are respective interfaces to first and second customer edge (CE) routers, the CE routers being spoke routers of a customer network;
   the routing information learned from the ingress interfaces includes respective routing entries for network nodes reachable via the first and second CE routers; and
   the packets received on the at least one ingress interface are packets from the first CE router being sent to another node of the customer network reachable via the second CE router.

2. The method of claim 1 further comprising running a dynamic routing protocol on said spoke router and on devices in communication with the ingress interfaces of said spoke router.

3. The method of claim 1 wherein said configuring a forwarding VRF table includes configuring said forwarding VRF table with addresses having a host mask for each attached client.

4. The method of claim 1 wherein said populating said routing Virtual Routing and Forwarding (VRF) table includes populating said routing VRF table with addresses having a non-host mask for each attached client.

5. The method of claim 3 wherein said host mask comprises a mask of /32.

6. The method of claim 4 wherein said non-host mask comprises a mask of /24.

7. A computer readable medium having computer readable code thereon for providing dynamic routing support for Half-Duplex Virtual Routing and Forwarding (HDVRF) environments, the medium comprising:
   instructions for configuring a forwarding Virtual Routing and Forwarding (VRF) table for a spoke router in a hub and spoke environment, said forwarding VRF table including information received from the hub, said forwarding VRF table used to forward incoming packets to a central location within the hub and spoke environment;
   instructions for populating a routing VRF table for said spoke router, said routing VRF table populated with routing information received from the hub and from ingress interfaces of said spoke router;
   instructions for propagating the routing information learned from ingress interfaces of said spoke router to the hub; and
   instructions for forwarding packets received on at least one ingress interface of said plurality of ingress interfaces of said spoke router according to said forwarding VRF table,
wherein:
   the spoke router is a provider edge (PE) router and the ingress interfaces are respective interfaces to first and second customer edge (CE) routers, the CE routers being spoke routers of a customer network;
   the routing information learned from the ingress interfaces includes respective routing entries for network nodes reachable via the first and second CE routers; and
   the packets received on the at least one ingress interface are packets from the first CE router being sent to another node of the customer network reachable via the second CE router.

8. The computer readable medium of claim 7 further comprising instructions for running a dynamic routing protocol on said spoke router and on devices in communication with the ingress interfaces of said spoke router.

9. The computer readable medium of claim 7 wherein said instructions for configuring a forwarding VRF table includes instructions for configuring said forwarding VRF table with addresses having a host mask for each attached client.

10. The computer readable medium of claim 7 wherein said instructions for populating said routing Virtual Routing and Forwarding (VRF) table includes instructions for populating said routing VRF table with addresses having a non-host mask for each attached client.

11. The computer readable medium of claim 9 wherein said instructions for configuring said forwarding VRF table with addresses having a host mask for each attached client include instructions for configuring said forwarding VRF table with addresses having a host mask of /32 for each attached client.

12. The computer readable medium of claim 10 wherein said instructions for populating said routing Virtual Routing and Forwarding (VRF) table includes instructions for populating said routing VRF table with addresses having a non-host mask of /24.

13. A system providing dynamic routing support for Half-Duplex Virtual Routing and Forwarding (HDVRF) environments, comprising:
   a network;
   a spoke router in communication with said network, said spoke router including:
      a forwarding Virtual Routing and Forwarding (VRF) table populated with routing information received from a hub; and
      a routing VRF table populated with routing information received from the hub and with information ingress interfaces of the spoke router;
   and
   at least one Customer Edge (CE) router in communication with said spoke router; and wherein said spoke router forwards packets received from said at least one CE router to a central location within the hub and spoke environment according to said forwarding VRF table,
wherein:
   the spoke router is a provider edge (PE) router and the ingress interfaces are respective interfaces to first and second customer edge (CE) routers, the CE routers being spoke routers of a customer network;
   the routing information learned from the ingress interfaces includes respective routing entries for network nodes reachable via the first and second CE routers; and
   the packets received on the at least one ingress interface are packets from the first CE router being sent to another node of the customer network reachable via the second CE router.

14. The system of claim 13 wherein a dynamic routing protocol is running on said spoke router and said at least one CE router in communication with said spoke router.

15. The system of claim 13 wherein said forwarding VRF table includes addresses having a host mask for each attached client.

16. The system of claim 13 wherein said forwarding VRF table includes addresses learned from the hub.

17. The system of claim 13 wherein said routing VRF table includes addresses having a non-host mask for each attached client.

18. The system of claim 15 wherein said host mask comprises a mask of /32.

19. The system of claim 17 wherein said non-host mask comprises a mask of /24.

20. A system providing dynamic routing support for Half-Duplex Virtual Routing and Forwarding (HDVRF) environments, comprising:
   means for configuring a forwarding Virtual Routing and Forwarding (VRF) table for a spoke router in a hub and spoke environment, said forwarding VRF table including information received from the hub, said forwarding VRF table used to forward incoming packets to a central location within the hub and spoke environment;

means for populating a routing VRF table for said spoke router, said routing VRF table populated with routing information received from the hub and from ingress interfaces of said spoke router;

means for propagating the routing information learned from ingress interfaces of said spoke router to the hub; and means for forwarding packets received on at least one ingress interface of said plurality of ingress interfaces of said spoke router according to said forwarding VRF table, wherein:

the spoke router is a provider edge (PE) router and the ingress interfaces are respective interfaces to first and second customer edge (CE) routers, the CE routers being spoke routers of a customer network;

the routing information learned from the ingress interfaces includes respective routing entries for network nodes reachable via the first and second CE routers; and the packets received on the at least one ingress interface are packets from the first CE router being sent to another node of the customer network reachable via the second CE router.

21. The system of claim 20 further comprising means for running a dynamic routing protocol on said spoke router and on devices in communication with the ingress interfaces of said spoke router.

22. The system of claim 20 wherein said means for configuring a forwarding VRF table includes means for configuring said forwarding VRF table with addresses having a host mask for each attached client.

23. The system of claim 20 wherein said means for populating said routing Virtual Routing and Forwarding (VRF) table includes means for populating said routing VRF table with addresses having a non-host mask for each attached client.

24. The method of claim 1, wherein:

the forwarding VRF table is a half-duplex VRF table statically configured with a default upstream route identifying the hub as a next hop to which upstream traffic received via the ingress interfaces is to be forwarded; and the routing VRF table is a half-duplex VRF table dynamically configured by operation of a dynamic routing protocol with downstream routes learned via the ingress interfaces, the downstream routes identifying downstream routers to which downstream traffic received from the hub is to be forwarded.

25. The method of claim 1 wherein:

the routing information received from the ingress interfaces of said spoke router and populated into said routing VRF table includes attached client addresses with non-host masks, each non-host mask identifying only a portion of the attached client address to be used for forwarding packets such that packets received from said central location having a matching portion of a destination address are forwarded to a respective one of the ingress interfaces; and configuring said forwarding VRF table includes populating said forwarding VRF table with addresses of local ones of the attached clients with a host mask, the host mask identifying the entirety of the addresses to be used for forwarding packets such that packets received at said ingress interfaces are locally terminated for delivery to the respective local attached clients.

26. The method of claim 25 wherein the local attached clients are local sessions of a dynamic routing protocol between the spoke router and the CE routers.

27. The computer readable medium of claim 7 wherein:

the routing information received from the ingress interfaces of said spoke router and populated into said routing VRF table includes attached client addresses with non-host masks, each non-host mask identifying only a portion of the attached client address to be used for forwarding packets such that packets received from said central location having a matching portion of a destination address are forwarded to a respective one of the ingress interfaces; and the instructions for configuring said forwarding VRF table include instructions for populating said forwarding VRF table with addresses of local ones of the attached clients with a host mask, the host mask identifying the entirety of the addresses to be used for forwarding packets such that packets received at said ingress interfaces are locally terminated for delivery to the respective local attached clients.

28. The computer readable medium of claim 27 wherein the local attached clients are local sessions of a dynamic routing protocol between the spoke router and the CE routers.

29. The system of claim 13 wherein:

the routing information received from the ingress interfaces of said spoke router and populated into said routing VRF table includes attached client addresses with non-host masks, each non-host mask identifying only a portion of the attached client address to be used for forwarding packets such that packets received from said central location having a matching portion of a destination address are forwarded to a respective one of the ingress interfaces; and said forwarding VRF table is further populated with addresses of local ones of the attached clients with a host mask, the host mask identifying the entirety of the addresses to be used for forwarding packets such that packets received at said ingress interfaces are locally terminated for delivery to the respective local attached clients.

30. The system of claim 29 wherein the local attached clients are local sessions of a dynamic routing protocol between the spoke router and the CE routers.

* * * * *

UNITED STATES PATENT AND TRADEMARK OFFICE
CERTIFICATE OF CORRECTION

PATENT NO.        : 7,623,535 B2                      Page 1 of 1
APPLICATION NO. : 10/937661
DATED             : November 24, 2009
INVENTOR(S)       : Guichard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this

Fourteenth Day of December, 2010

David J. Kappos
*Director of the United States Patent and Trademark Office*